March 14, 1933. W. G. WOLFE 1,900,966
PROJECTION APPARATUS
Filed Dec. 27, 1927 2 Sheets-Sheet 2
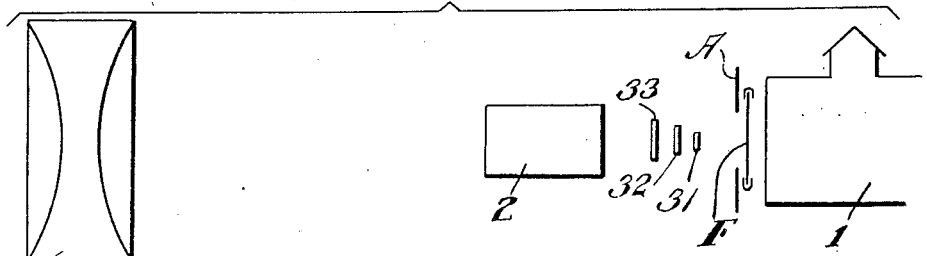
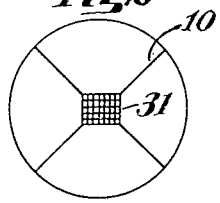
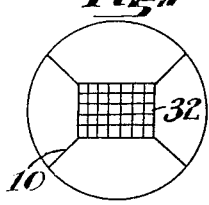
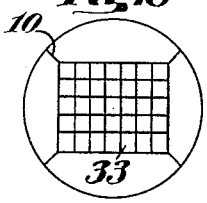
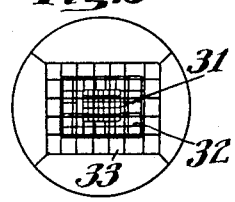
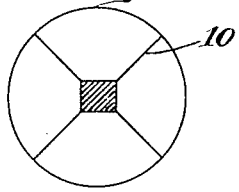
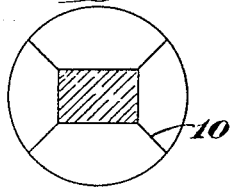
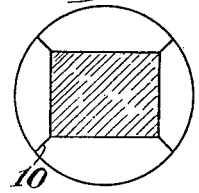
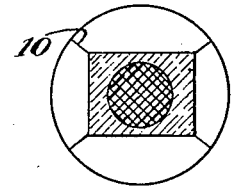
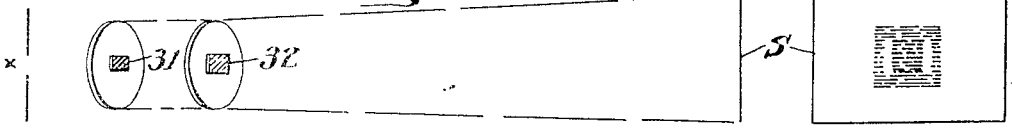
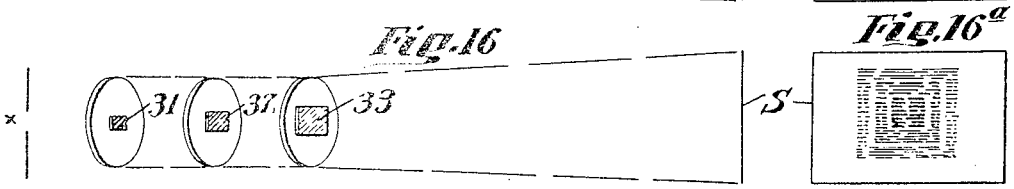
Inventor
Walter G. Wolfe
By Attorney Patented Mar. 14, 1933

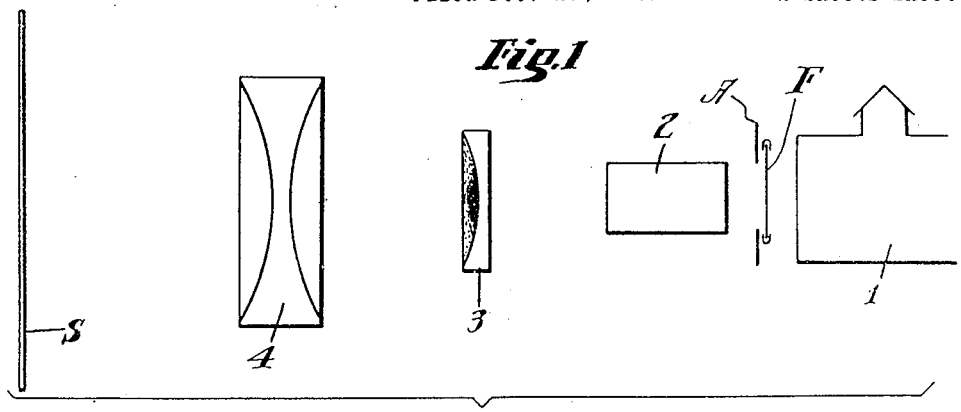
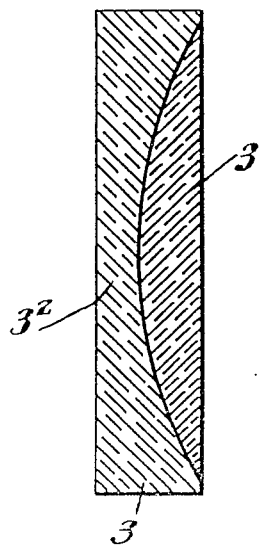
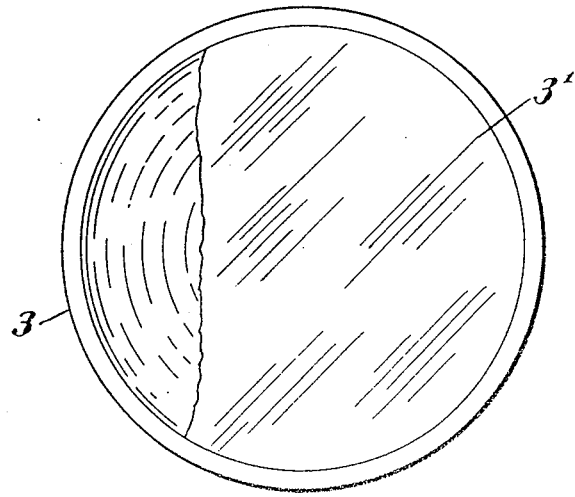
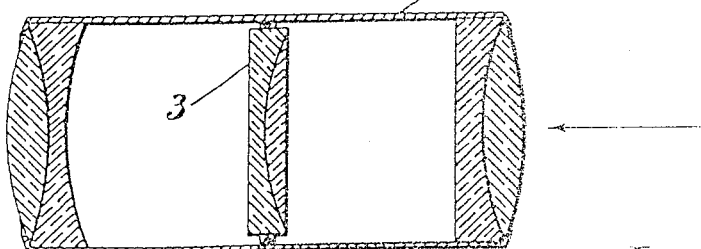

1,900,966

UNITED STATES PATENT OFFICE

WALTER G. WOLFE, OF GREENWOOD, MASSACHUSETTS, ASSIGNOR TO WILMOT R. EVANS, TRUSTEE, OF BOSTON, MASSACHUSETTS

PROJECTION APPARATUS

Application filed December 27, 1927. Serial No. 242,647.

My invention relates to the control of the intensity of different portions of light beams and the rendering uniform of illumination as in the case of screen intercept in projection. In addition to projection another important field for my invention is that of photography in which a beam may be modified as where enlargements are made. This is very important in the enlargement of groups in which it is desirable to shade the center slightly so that the group margins will not be under exposed. Under such conditions where the projection is pictorial, differences in illumination in different parts of the screen is very undesirable. Where the projector is set relatively close to a screen as in backstage projection, these difficulties are exaggerated and it has seemed impossible to secure uniform illumination of the screen. This difference of illumination becomes particularly apparent and annoying at the intercept of the axis of projection. Here the picture is apt to appear with a discernible bright spot or with certain transparent screens as a band and as such detracts considerably from the perfection of the performance.

The difficulty has been recognized and efforts have been made to meet it but two difficulties have appeared to be insurmountable. One that of using a cut off for the light that could be variant without being obstrusive, and the other that of screening without having the picture optically projected in visible or interfering effect upon the observed screen effect. In accordance with my invention I am able to vary optically or physically the intensity of the beam radially without refractive aberration and by systematic placement eliminate projective intrusion.

Another difficulty common to motion picture projection rather generally is also involved in my present invention. This has to do with the matter of color in the projecting beam which with some light sources is sufficient to give undesired effects, or in the case of colored pictures to prevent desired effects.

My invention not only contemplates a uniform distribution of light over any screen intercept no matter how wide the angle of projection may be and without refractive defect, but also a color control which may supplement or utilize the color of the light source or the color of the screen or both.

As illustrative of the principles involved I will show in the accompanying drawings and will describe in the following specification embodiments by which my invention may be successfully practised. Throughout the specification and drawings like reference characters are employed to indicate corresponding parts. In the drawings:

Fig. 1 is a diagrammatic indication of a projector and variant screen set up in accordance with my invention.

Fig. 2 a sectional view of such a screen.

Fig. 3 a front elevation of the same partly broken away for illustrative purposes.

Fig. 4 a mounted projection system with an interposed screen in accordance with my invention.

Fig. 5 shows a projection set up with the cut off disposed between the stop and the projector system.

Figs. 6, 7 and 8 illustrate a series of three plane cut offs of net work type.

Fig. 9 represents a composite single screen of this type.

Figs. 10, 11 and 12 illustrate a series of screens of absorption type as distinguished from net work type.

Fig. 13 illustrates a composite screen.

Figs. 14, 15 and 16 represent successively with their corresponding Figs. 14a, 15a and 16a, the cut off effect by the use of the screens shown in Figs. 6, 7 and 8, as successively combined.

In the drawings I have shown a projector 1 having a projecting lens system 2. In accordance with my previous invention filed May 16, 1927, Serial No. 191,589, which has now matured into Letters Patent No. 1,802,099, April 21, 1931 in front of this is located a lens 4 for projecting a wide angle beam on a projecting screen S, but at a short distance, say 18 to 28 feet from it. This is mentioned as usual backstage distance.

The member 3 comprises a lenticular member $3^1$ of glass, which by reason of its radial variation of degree of opacity or light stopping power, cuts the beam decreasingly from its center outwardly. The member 3¹ may be of plano-convex with spherical or conic form as desired. While such a screen member cuts the beam with a gradual shading there is danger of image formation and my inventive concept provides for the arrangement of such a screen along the optical system so that no image is defined. Between these may be found a plane which is ultra focal or non-focal for the lens systems. There are two favorable planes or regions advantageous for the non-focal effect heretofore described. It may be placed behind the projection lens as shown in Fig. 5 and this is really a preferable place because the optical constants do not have to be so true. For this reason it is shown with the mechanical screen system in its triple form. Another region illustrated in Fig. 1 in connection with the lenticular form of my screen is that between the projection lens and the wide angle or diverging lens 4 when such a lens is used. This region is more limited and a higher perfection in optical constants is required.

I am also able, as shown in Fig. 4, to mount my screen between the lenses of the usual projection assembly therein indicated. This is, of course, a very convenient form for the operator to handle and permits pre-made adjustments so that proper position can be attained. At such plane or narrow zone I introduce my variant screen 3.

I have indicated a film at F and at A the film aperture. This member 3¹ may be of yellow, green or blue glass or merely smoke color, as desired. The blue or green is preferable with an arc light where the color is to be eliminated from the beam to obtain the full value of a colored picture or the color may be selected with reference to its effect on the color value of the screen or colors may be variously combined. Instead of using colored glass I may get delicate effects by using a glass or other medium of darker color.

The other element 3² is a concaved lenticular member fitting the plano-convex member 3¹ and in most cases having the same refractive index, (if it is in front it must be of the same refractive index) the two being united so that it has no refractive effect on the beam coming from the lens system 2. In this way I am able by so shaping the radius of convexity of the member 3¹ that the relation of its maximum depth and the degree of its fade away radially will give at the desired projecting distance and the angle of divergence in the lens 2, an intercept on the screen which will be uniform. This can be accomplished with great accuracy by candle test.

The lenticular form of screen above described while having the several advantages indicated is obviously somewhat expensive and while for exact work and particularly for color correction as in the projection of colored films or slides, there is need of less expensive apparatus for which I provide as follows.

I find that I am able to get graduated shut offs by using a mesh, as for example, a wire mesh. For such purposes I may use a series of sections of wire screen as indicated in Figs. 6, 7 and 8. In Fig. 6 I have shown a screen 31 suspended by wires 10. This is preferably a small screen of fine mesh and adapted to be disposed axially of the beam and in one of the non-focal regions before described. With this and spaced apart therefrom a short distance so that there will be a slight fringing of the shadow, I set another screen 32 similarly supported by wires 10 and at another interval a screen 33. These positioned as shown in Fig. 5 give a progressive darkening of the center of the beam fading away to full brilliance at the margin. This I have attempted to illustrate in Figs. 14, 15 and 16. In Fig. 14 I have shown the screen 31 and have indicated in Fig. 14a the darkened area as it would appear on a screen S. In Fig. 15 I have shown the member 31 combined with the member 32 and have shown in Fig. 15a a composite effect. In Fig. 16 I have shown the two previous members coupled with a third member 33 with the resultant effect shown in Fig. 16a. By the spacing of these members I am able to merge the successive shadows so as to get what is in effect a series of umbræ which in composite upon an intercept shows a darkening at the center with a gradual fading away and with comparatively little loss of light. This combination may also be practised with a series of smoked or colored screens of glass, bakelite, or in fact almost any translucent material. These may be suspended by wires 10 as heretofore described or may be cemented on flat discs of glass, all as shown in Figs. 10, 11 and 12. In Fig. 9 I have shown a screen 34 which is in effect a combination of the screens 31, 32 and 33 in a single plane. Such a screen may be made by progressive weavings in a large mesh or by the pulling of the wires in a fine mesh so as to get the closer mesh at the center and the larger mesh at the edges. In Fig. 13 I have shown a still further modification.

As heretofore suggested, materials, colors and proportions may be varied and my filter may be used in various combinations, all without departing from the spirit of my invention if within the limits of the appended claims.

What I therefore claim and desire to secure by Letters Patent is:

1. In a projection apparatus, a wide angle projector, a translucent display screen in intercepting relation to the beam thereof, and a colored screen member intercepting the beam axially, and having a variant absorptivity decreasingly from the center outwardly.

2. In a projection apparatus, a wide angle projector, a translucent display screen in intercepting relation to the beam thereof, and a screen member intercepting the beam axially and having a variant absorptivity decreasingly from the center outwardly.

3. In a projection apparatus, a wide angle projector, a translucent display screen in intercepting relation to the beam thereof, and a screen member comprising a concave and a convex member of substantially zero focus, the convex member being of illumination retarding characteristic.

In testimony whereof I affix my signature.
WALTER G. WOLFE.